Jan. 31, 1961

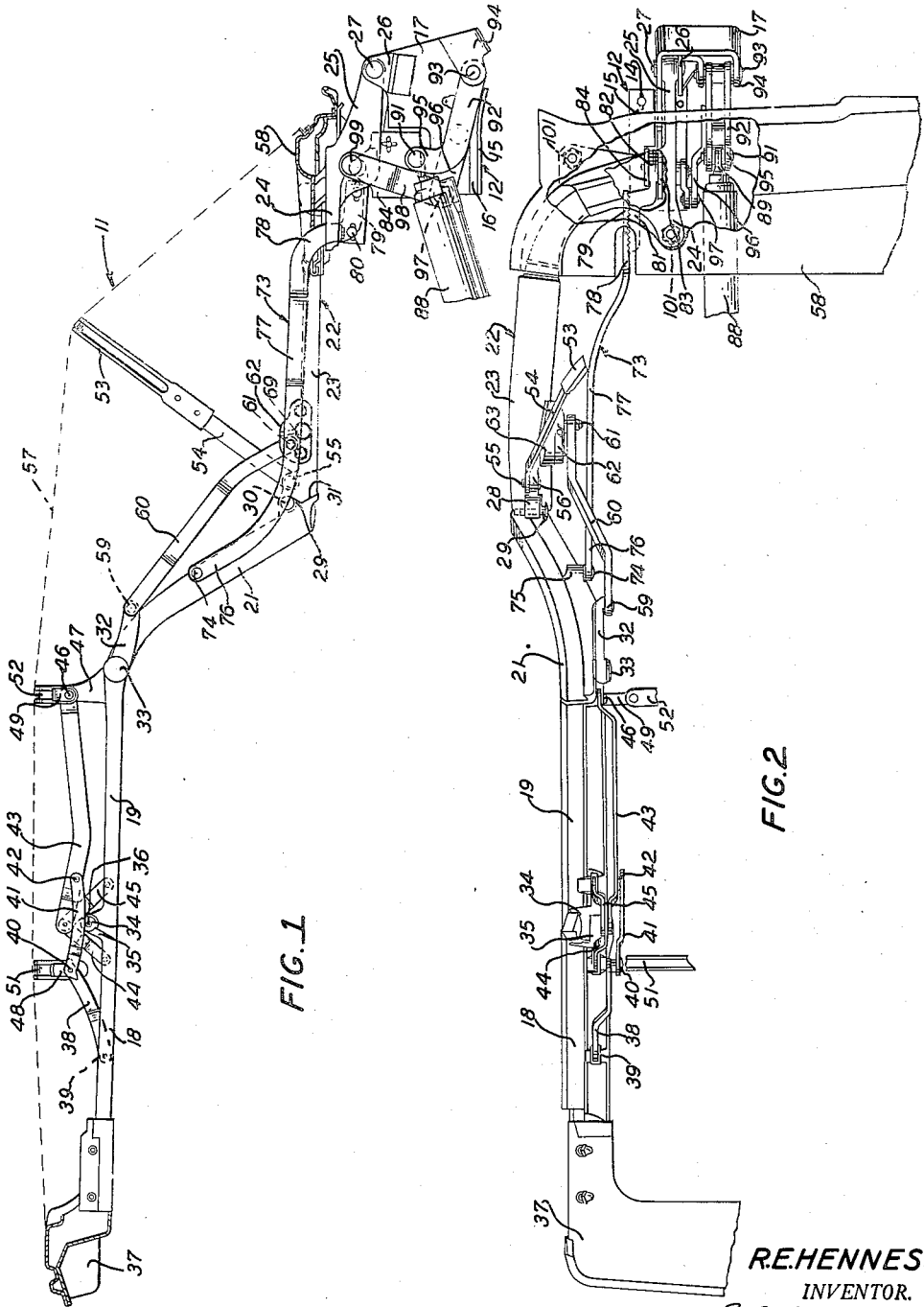

R. E. HENNESSY 2,970,007

CONVERTIBLE TOP

Filed Feb. 3, 1959

R.E. HENNESSY
INVENTOR.

BY E. C. McRae
J. R. Faulkner
J. J. Roethel

ATTORNEYS

Jan. 31, 1961  R. E. HENNESSY  2,970,007
CONVERTIBLE TOP
Filed Feb. 3, 1959  3 Sheets-Sheet 3

R. E. HENNESSY
INVENTOR.

BY  E. C. McRae
    J. R. Faulkner
    J. J. Roethel

ATTORNEYS

United States Patent Office 2,970,007
Patented Jan. 31, 1961

2,970,007

CONVERTIBLE TOP

Robert E. Hennessy, Allen Park, Mich., assignor to Ford Motor Company, Dearborn, Mich., a corporation of Delaware Filed Feb. 3, 1959, Ser. No. 790,864

11 Claims. (Cl. 296—117)

This invention relates to a foldable top for a motor vehicle.

In a conventional convertible type vehicle body, provision is made for housing the top, when collapsed, in a recess or pocket extending the width of the body between the rear edge of the passenger compartment and the forward edge of the luggage compartment. Current trends in vehicle body design are making it increasingly difficult for vehicle designers to provide the necessary space for such conventional storage. The trend which is causing the greatest difficulty is that toward an extremely low belt line. A conventional foldable top in its collapsed condition and the operating mechanism for raising and lowering it are of substantial cumulative vertical dimension. Storage of the collapsible top in the conventional manner in a vehicle body having a low belt line would result in an unsightly hump to the rear of the passenger compartment.

It is an object of the present invention to provide a foldable top structure for a motor vehicle in which the top is not only collapsed but is swung from its forwardly extending direction in its raised position to a rearwardly extending direction in its lowered position. That is, the top structure is collapsed and inverted as it is moved from its raised to its lowered position. The top in its collapsed condition is preferably stored within the rear luggage compartment of the vehicle. When so stored, the collapsible top structure embodied in the present invention does not require a separate storage compartment. Further, in its stored or collapsed condition, the vertical height of the top is substantially only that of its collapsed linkage. The vertical height of the operating mechanism adds nothing to the vertical clearance required. The operating mechanism is positioned forwardly of and not below the top structure when the latter is in stored position.

Other objects and advantages of this invention will be made more apparent as this description proceeds, particularly when considered in connection with the accompanying drawings, wherein:

Fig. 1 is a side elevational view of one side of the convertible top linkage embodying the present invention as it appears from the inside of the vehicle passenger compartment when the folding top structure is in its raised position;

Fig. 2 is a fragmentary top plan view of the structure shown in Fig. 1;

Figure 3:
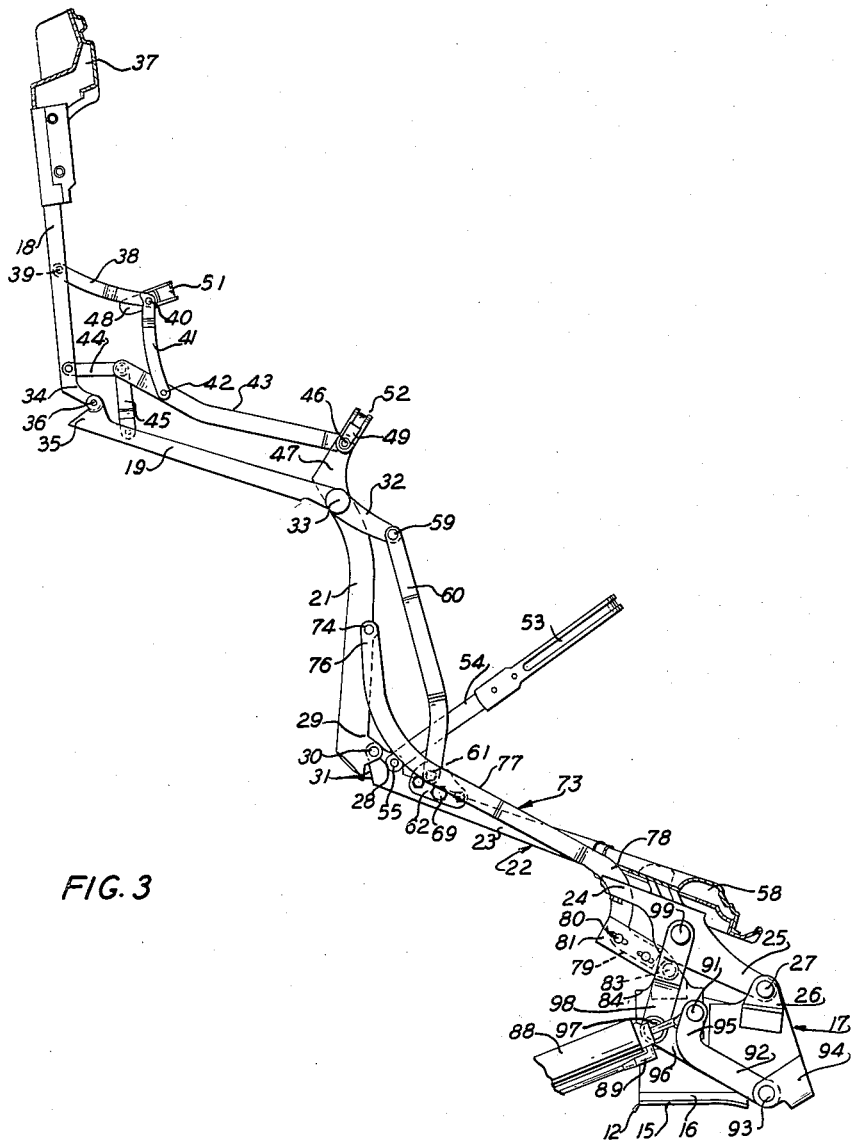
Fig. 3 is a side elevational view illustrating the folding top linkage of Fig. 1 as it appears when the top is in an intermediate position between its raised and lowered position.

Referring now to the drawings, the reference character 11 generally designates a folding top structure adapted to be mounted on a motor vehicle body (not shown) of the convertible type. The designation "convertible type" as used herein refers to vehicle bodies in which the top structure is a fabric enclosure supported on a linkage structure and is adapted to be folded into a storage well when it is desired to operate the vehicle with the passenger compartment open to the weather. This is as distinguished from other type vehicle bodies in which the passenger compartment may be opened to the weather, such as a retractable hardtop in which a metal top may be retracted into a storage compartment or such as a sedan of the conventional closed body type provided with a slidable roof panel or the like.

Inasmuch as both sides of the folding top structure embodied herein are symmetrical, only one side will be described in detail. Referring now to the drawings, particularly Figs. 1, 2 and 3, there is illustrated a base member 12 adapted to be secured to the floor pan (not shown) of the vehicle body luggage compartment by suitable bolts or the like 14.

The base member 12 is a weldment having a foot portion 15 receiving the bolts 14 and a vertical upstanding leg portion 16. Secured to one side of the leg portion 16 is a bracket 17. The bracket 17 is also a weldment and is designated as the folding top main pivot bracket, as will be more fully explained.

Referring now to the side rail structure, four side rails are provided at each side of the top. These may be identified as the front side rail 18, the front intermediate side rail 19, the rear intermediate side rail 21, and the rear side rail 22. The rails are preferably molded of a suitable light weight metal, such as an aluminum or magnesium alloy. The rear side rail 22, as viewed from above, see Fig. 2, is provided with an elongated rail section 23 extending forwardly from one side of a platform portion 24. Extending rearwardly from the other side of the platform portion in substantially parallel relation to the rail section 23 is an arm portion 25. The bracket 17 is provided at its upper rear corner with an upwardly opening U-shaped bracket 26. The rear end of arm portion 25 is pivotally connected to the bracket 26 by a pivot stud 27. At the forward end of its rail section 23, the rear side rail 22 is provided with an upwardly and forwardly projecting tongue 28. The rear intermediate side rail 21 is provided with an integral bifurcation 29 embracing the tongue 28 on the rail section 23. The bifurcation 29 is pivotally connected to the tongue 28 by means of a pivot pin 30. As best seen in Fig. 1, the pivotal connection between the rear intermediate side rail 21 and the rear side rail 22 is so constructed and arranged that the longitudinal axis of the rail 21, as viewed in Fig. 1, is upwardly and forwardly inclined relative to the longitudinal axis of the rail section 23. The rail 21 and rail section 23 abut at 31 when the top is in raised position.

The next rail forwardly of the rear intermediate side rail 21 is the front intermediate side rail 19. At its rearward end, the front intermediate side rail 19 is formed with a laterally offset extension 32. The rail 19 is pivotally connected just forward of its extension 32 by means of a pivot pin 33 to the upper end of the rear intermediate side rail 21. The front intermediate side rail 19 is provided at its forward end with an integral bifurcation 34 embracing the tongue 35 formed on the rearward end of the front side rail 18, and pivotally connected thereto by a pivot pin 36. As best seen in Fig. 2, the pivotal connection between the front and front intermediate side rails 18 and 19, respectively, is located adjacent the upper edges of the rails permitting the ends of the rails to abut each other directly beneath the pivotal connection when the top is in raised position. It will be noted that in the raised position of the top, the main body portions of the front side rail, the front intermediate rail, the rear intermediate rail and the rail section 23 of the rear side rail 22 form a continuous rail.

The front side rail carries at its forward end a conventional header 37 adapted to engage and be secured to the frame of the vehicle windshield (not shown) when the top is raised.

The folding action of the front and front intermediate side rails is controlled by a series of links. Intermediate its ends the front side rail has a pivotal connection with an upwardly and rearwardly inclined link 38. The pivotal connection is by means of pivot pin 39. The rear end of the link 38 is pivotally connected at 40 to a link 41. The link 41 extends in a substantially horizontal parallel relationship to the side rails 18 and 19 in top raised position and is pivotally connected at its rear end by a pivot pin 42 to a second substantially horizontally extending link 43. The link 43 is supported at its forward end by two angularly positioned links 44 and 45 which are pivotally connected to the side rails 18 and 19, respectively. The links 44 and 45 straddle the pivotal connection between the front side rail 18 and the front intermediate side rail 19. The link 43 is pivotally connected at its rear end at 46 to an upwardly extending flange or extension 47 integral with the upper end of the rear intermediate side rail 21. As will more fully be explained, the link 41 actuates the other links related thereto during the lowering of the top.

At each pivotal connection 40 and 46, suitable brackets 48 and 49, respectively, are provided to which the roof bows 51 and 52, are connected. A third roof bow 53 is connected to an elongated arm 54 which, in turn, is pivotally connected at 55 to an upright flange 56 on the upper side of the rear side rail 22 immediately to the rear of its pivotal connection 30 with the rail 21. A suitable fabric top, shown in phantom and identified by the reference numeral 57 in Fig. 1, interconnects the header 37, the roof bows 51, 52 and 53, and a movable panel 58, the latter to be more fully explained.

Figure 6:
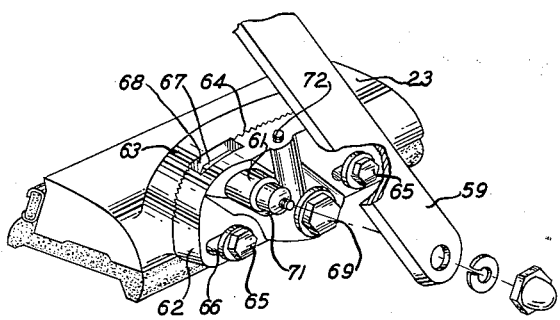
Fig. 6 is an enlarged fragmentary exploded perspective view illustrating the adjustable mounting of one of the main top support links.

Returning now to the description of the linkage system embodying the present invention, it will be noted that the laterally offset extension 32 has a pivotal connection at 59 with a downwardly and rearwardly extending link 60. The link 60 is laterally offset outwardly, as best seen in Fig. 2, and is pivotally connected at its lower end by a pivot stud 61 to a bracket 62. The bracket 62 is shown in detail in Fig. 6. It will be noted that the rear side rail section 23 is provided with a flange or mounting pad 63 integral therewith. The opposed faces of the flange 63 and bracket 62 are serrated at 64 to provide slip-proof interlocked surfaces. Bolts 65 projecting through slots 66 in the bracket 62 retain the bracket on the side rail, the slots 66 permitting selective longitudinal positioning of the bracket on the side rail. The pivot stud 61 is attached to a plate 67 slidable in a slot 68. An adjusting cam 69 is provided to lock the plate 67 in vertically selected position, the pivot stud 61 being movable in a slot 71. A set-screw 72 is provided to lock the adjusting cam 69 against displacement.

The link 60 is a balance link affecting the relationship of the side rails 18 and 19 to the top of the vehicle door window (not shown). By proper adjustment of the adjusting cam 69 to raise or lower the pivot member 61 for the balance link 60, the folding top may be adjusted to its optimum relationship, particularly with respect to obtaining the optimum clearance between the bottom of the side rails 18 and 19 and the top of the vehicle door window in raised position of the latter. Since the head of the adjusting cam 69 is located in a readily accessible position within the vehicle body, adjustment can be readily made not only during the initial assembly of the top but also at any time thereafter as required.

The linkage system embodying the present invention includes a second balance link 73. This link is pivotally connected at 74 to a boss 75 located intermediate the ends of the rear intermediate side rail 21. As seen in Fig. 1, the link 73 has a serpentine appearance with its forward end section 76 paralleling the longitudinal axis of the rail 21, its center section 77 paralleling the rail section 23 of the rear side rail 22, and its rear end portion 78 being laterally and downwardly stepped and terminating in a substantially horizontally extending appendage 79.

The appendage 79 is secured by bolts 80 to the free end of a pivoted arm or extension member 81. The bolts 80 project through conventional slots, preferably located in the extension member 81, to permit longitudinal adjustments to be made. The abutting faces of the appendage 79 and extension member 81 are serrated to provide a non-slip interlock therebetween.

The rear end portion 82 of the extension 81 is laterally displaced from the part thereof connected to the appendage 79 of the balance link 73 and is pivotally journalled on a pivot shaft or pin 83 journalled in a bracket 84. The bracket 84 is provided with a plate portion serrated on one face thereof. The serrated face is adapted to be positioned in abutting relation to a serrated face of the upper forward corner portion of the base member 12. Suitable bolts 86 projecting through crossed slots 87 provide for vertical and horizontal adjustment of the bracket 84 on the base member. This adjustment as well as the adjustment between the appendage 79 and the extension 81 permits proper positioning of the rear intermediate side rail 21 relative to the rear quarter window of the vehicle body.

It will be understood that the adjustment of the side rail 21 is made before the adjustment of the side rails 18 and 19 since the balance link 73 is supported on a fixed or base member whereas the balance link 60 is supported on a side rail member, i.e., the side rail 22.

The folding top of the present invention is designed for power operation by means of a hydraulic cylinder and piston assembly, generally designated 88. The lower end of the cylinder assembly is pivotally connected in a conventional manner to the vehicle body at a point diagonally forwardly and downwardly from the base member 12. The piston rod 89 of the cylinder assembly 88 is pivotally connected at 91 to lower power link 92. The lower power link 92 is pivotally mounted on the bracket 17 carried by the base member 12. The pivotal mounting for the lower power link comprises a pivot pin 93 journalled on a lower yoke or U-shaped portion 94 of the bracket 17. The lower power link 92 is substantially L-shaped, being provided with an upwardly extending leg portion 95. It is to this leg portion that the pivotal connection 91 of the piston rod 89 is made. The lower power link is provided with a forwardly extending and laterally offset extension 96 at one side thereof.

The forward end of the lower power link extension 96 is pivotally connected at 97 to an upper power link 98. The upper power link 98 in top raised position extends in a substantially upward direction and is pivotally connected by a pivot stud 99 to one side of the leg portion 25 of the rear side rail 22, the pivotal axis being substantially parallel to the pivotal axis of the rail 22 on the bracket 17.

The center portion 24 of the rear side rail 22 was termed a "platform portion" since it supports the substantially rectangular panel or package tray 58 adapted to extend across the width of the vehicle body, the panel being secured by suitable bolts 101. The panel 58 rigidly interconnects both side rail linkage systems at the rear end thereof, it being understood that the linkage systems are interconnected at the front end thereof by the header 37. The preferred embodiment of the invention utilizes two cylinder and piston assembly units, one for each side of the folding top structure.

Figure 4:
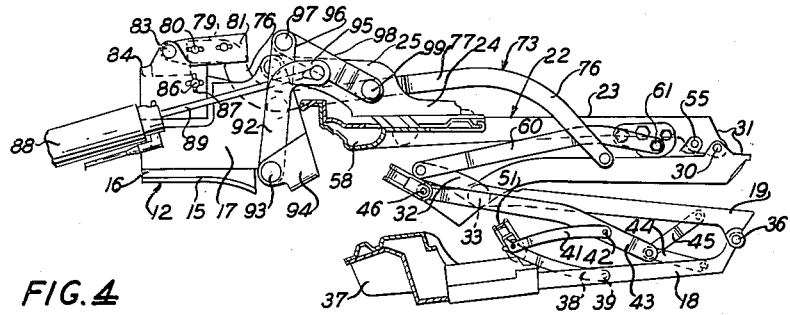
Fig. 4 is a side elevational view illustrating the top linkage in its fully lowered position.

The operation of the folding top structure may be best followed with reference to Figs. 1, 3 and 4 which illustrate the structure in raised, intermediate and folded conditions, respectively.

In the raised position of the roof, the piston rod 89 is retracted into the cylinder and piston assembly 88, see Fig. 1. Upon actuation of the cylinder and piston assembly, force is applied by the piston rod 89 in a direction to cause the lower power link 92 to swing in a clockwise direction, as viewed in Fig. 1, about its pivotal axis 93.

Power is transmitted from the lower power link 92 through the upper power link 98 to the rear side rail 22 tending to swing the latter in a clockwise direction about its pivot axis 27. As the side rail 22 begins to raise, it tends to lift the rear intermediate side rail 21 upwardly. The movement of this side rail is influenced, however, by the balance link 73 which is swingable about the fixed base pivot 83. As the side rail 21 is raised, it is pulled rearwardly or in a clockwise direction about its pivotal connection with the rear side rail 22. As this occurs, the front side rail 18 and the front intermediate side rail 19 are also being folded through the influence of the balance link 60. As the rear intermediate side rail 21 begins to swing back on the rear side rail 22, the balance link 60 extending between the rear side rail 22 and the extension 32 of the front intermediate side rail 19 tends to force the latter downwardly or in a counterclockwise direction, as viewed in Fig. 1. The geometry of the linkage system comprising the links 38, 41, 43, 44 and 45 is such that the front side rail 18 is pulled upwardly or in a clockwise direction, as viewed in Fig. 1.

Continued application of the hydraulic force to the power link 92 through the interconnected side rails and linkage results in swinging the top structure to the position shown in Fig. 3, substantially between the raised and lowered positions of the top. It will be noted that in this position, the front side rail 18 and the rear intermediate side rail 21 are substantially parallel as are the front intermediate side rail 19 and the rear side rail 22. To this position the folding action of the top appears to be following conventional practice and it would be expected that the side rails 18, 19 and 21 would be folded down on the side rail section 23. In effect this does happen, but in accordance with the present invention, the side rail section 23 is swung through an arc of substantially 180° as the folding action takes place. Thus, the side rails 18, 19 and 21 and their associated linkage system instead of being nested on the top of the side rail section 23, as they would be when conventional top folding practice is followed, are nested beneath the side rail section 23. This relationship is illustrated in Fig. 4 which illustrates the position of the component parts of the top when the latter has been moved to its lowered position.

As the top travels from the Fig. 3 to the Fig. 4 position, the front side rail 18 continues its clockwise movement relative to its pivotal connection 36 with the front end of the front intermediate side rail 19. The front intermediate side rail 19 continues its swinging movement about the pivot axis 33 toward the rear intermediate side rail 21. And the rear intermediate side rail 21, carrying the rails 18 and 19 with it, folds back against the rear side rail section 23. These movements are substantially completed upon the rear side rail 22 passing through the upright position at which it begins to invert. The movement of the side rails beyond this point are more in the nature of a tightening and tucking in process. It will be noted that the geometry of the power links 92 and 98 is such that the rear side rail 22 travels substantially 180° while the power link 92 swings through an arc of approximately 90°.

It will be understood that the vehicle top in the Fig. 4 position is preferably adapted to be stored within the luggage compartment of the vehicle. The luggage compartment closure lid is suitably hinged at the rear so that it may swing open to receive the top structure during its collapsing movement. The lid may then be closed concealing the collapsed top structure therebeneath.

It will be further understood that suitable electrical control circuitry including the necessary limit switches, control switches, relays and the like are provided to control the movements of the top to and from its extended and stored positions.

Figure 5:
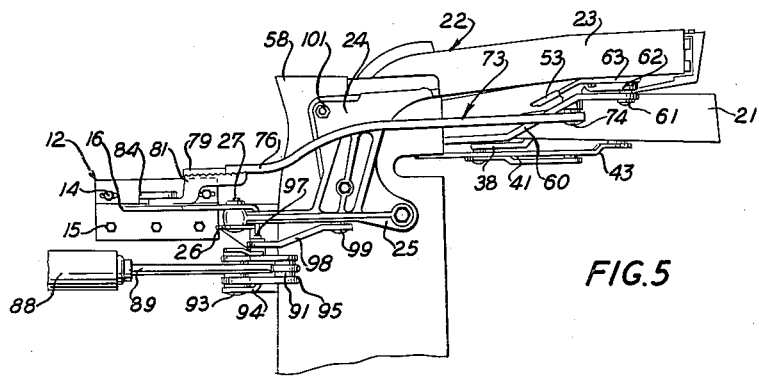
Fig. 5 is a fragmentary top plan view of Fig. 4.

As was stated in the opening discussion of the present invention, the vehicle top collapsed as above described requires much less vertical height than a conventionally folded top. It will be noted (see Fig. 4) that the folded top lies below the top of the base member 12. In a conventional foldable top, the height of the top structure in folded condition would be cumulative to the height of the folded linkage and hydraulic cylinder assembly (see Fig. 5 of U.S. Patent 2,617,681).

It is recognized that the storage of the top in the manner herein described results in a loss of space in the luggage compartment available for luggage, golf bags and the like. However, it has been found that when so-called convertible type vehicles are used for traveling from city to city, the top is very seldom put down or collapsed. Since on long trips is generally the only time when the luggage compartment is completely filled with luggage, the encroachment on the luggage compartment space will seldom be noticed. Even with the top in collapsed condition, there is still sufficient room for the handbags and sports gear to be transported when the vehicle is used for activities tending to create the open air or "top down" desire.

It will be understood that the raising of the top from its Fig. 4 collapsed condition to its Fig. 1 raised position follows a reverse cycle from that above described.

It will be further understood that the invention is not to be limited to the exact construction shown and described, but that various changes and modifications may be made without departing from the spirit and scope of the invention, as defined in the appended claims.

What is claimed is:

1. In a foldable top structure for a vehicle body, an articulated side rail having in top raised position substantially horizontal and forwardly extending front and rear members joined by an upwardly and forwardly inclined intermediate member, means pivotally mounting said rear member at its rear end on a support member on said vehicle body, power means coupled to said rear member actuatable to swing the latter above and about said pivotal mounting means to a substantially horizontal and rearwardly extending top lowered position, and link means comprising balance arm means pivotally coupled to selective ones of said members, said link means controlling the movement of the rail members relative to one another to cause said front and intermediate members to be folded against said rear member as the latter swings about its pivotal mounting to said top lowered position to thereby collapse said top, said front and intermediate members being stored beneath said rear member in top collapsed position.

2. In a foldable top structure for a vehicle body, an articulated side rail having in top raised position substantially horizontal and forwardly extending front and rear members joined by an upwardly and forwardly inclined intermediate member, means pivotally mounting said rear member at its rear end on a support member on said vehicle body, power means coupled to said rear member actuatable to swing the latter above and about said pivotal mounting means to a substantially horizontal and rearwardly extending top lowered position, and link means comprising balance arm means pivotally coupled to selective ones of said members, said link means controlling the movement of the rail members relative to one another to cause said front and intermediate members to be folded against said rear member as the latter swings about its pivotal mounting to said top lowered position to thereby collapse said top, said front and intermediate members being folded against the side of said rear member which is the upper side in top raised position, said upper side becoming the bottom side in top collapsed position and said front and intermediate members being stored therebeneath.

3. In a foldable top structure for a vehicle body, an articulated side rail having in top raised position substantially horizontal and forwardly extending front and rear members joined by an upwardly and forwardly inclined intermediate member, means pivotally mounting said rear member at its rear end on a support member on said vehicle body, power means coupled to said rear member actuatable to swing the latter above and about said pivotal mounting means to a substantially horizontal and rearwardly extending top lowered position, and link means comprising a first balance arm means interposed between said intermediate member and support member and a second balance arm means interposed between said rear member and a front member, said balance arm means being pivotally connected at their ends to the respective members, said link means controlling the movement of said rail members relative to one another to cause said front and intermediate members to be folded against said rear member as the latter swings about its pivotal mounting to said top lowered position to thereby collapse said top, said folded members being stored beneath said rear member in top collapsed position.

4. In a foldable top structure for a vehicle body, a sectional side rail having a rear section pivotally mounted at its rear end upon said body, an intermediate section pivotally connected to the front end of said rear section, and pivotally interconnected front sections pivotally connected to said intermediate section, said rear and front sections extending in a substantially horizontal forward direction and said intermediate section being upwardly and forwardly inclined in top raised position, power link means interposed between said body and said rear section, power means operatively connected to said power link means to actuate the latter to swing said rear section above and about its pivotal mounting rearwardly to a top lowered position in which it extends in a generally horizontal direction, said link means including a first and second balance arms, said first balance arm being pivotally mounted at one end upon said body and pivotally connected at its other end to said intermediate section, said second balance arm being pivotally connected at one end thereof to said rear section and at its other end to a front section, said balance arms being effective to fold said front and intermediate sections against said rear section as the latter swings about its pivotal mounting to thereby collapse said top, said front and intermediate sections being carried beneath said rear section in top lowered position.

5. In a foldable top structure for a vehicle body, a sectional side rail having a rear section pivotally mounted at its rear end upon said body, an intermediate section pivotally connected to the front end of said rear section, and pivotally interconnected front sections pivotally connected to said intermediate section, said rear and front sections extending in a substantially horizontal forward direction and said intermediate section being upwardly and forwardly inclined in top raised position, power link means interposed between said body and said rear section, power means operatively connected to said power link means to actuate the latter to swing said rear section above and about its pivotal mounting rearwardly to a top lowered position in which it extends in a generally horizontal direction, said link means including a first and second balance arms, said first balance arm being pivotally mounted at one end upon said body and pivotally connected at its other end to said intermediate section, said second balance arm being pivotally connected at one end thereof to said rear section and at its other end to a front section, said balance arms being effective to fold said front and intermediate sections against said rear section as the latter swings about its pivotal mounting to thereby collapse said top, said front and intermediate sections being folded against the side of said rear section which is the upper side in top raised position, said upper side becoming the lower side in top collapsed position and said front and intermediate sections being stored therebeneath.

6. A folding top structure for a motor vehicle comprising a flexible top, articulated side rails at each side of said top adapted to support the latter in top raised extended position, said side rails including rear members, a pair of spaced supporting brackets mounted on said vehicle body, each rear member being pivotally connected to a respective bracket, a laterally extending panel member secured at each of its ends to a rear member, said rear members and panel member in top raised position extending in a substantially horizontal and forward direction, power means coupled to at least one of said members actuatable to swing said rear members and panel member above and about the pivotal connection to said brackets to a substantially horizontal and rearwardly extending top lowered position, and link means comprising balance arm means pivotally coupled to sections of said articulated side rails, said link means controlling the movement of said sections relative to one another to cause the latter to be folded against said rear member as the latter and said panel member is swung about said pivotal connection to said top lowered position to thereby collapse said top against said panel member, said folded sections and top being stored beneath said rear members and panel member in top collapsed position.

7. A folding top structure for a motor vehicle comprising a flexible top, a sectional side rail at each side of said top adapted to support the latter in top raised extended position, each side rail having a rear section pivotally mounted at its rear end upon said body, an intermediate section pivotally connected to the front end of said rear section, and pivotally interconnected front sections pivotally connected to said intermediate section, said rear and front sections extending in a substantially horizontal forward direction and said intermediate section being upwardly and forwardly inclined in top raised position, power link means interposed between said body and each rear section, power means operatively connected to said power link means to actuate the latter to swing each rear section above and about its pivotal mounting rearwardly to a top lowered position in which it extends in a generally horizontal direction, and link means including a first and second balance arms, each first balance arm being pivotally mounted at one end upon said body and pivotally connected at its other end to an intermediate section, each second balance arm being pivotally connected at one end thereof to a rear section and at its other end to a front section, said balance arms being effective to fold said front and intermediate sections against the respective rear sections as the latter swing about their pivotal mounting to thereby collapse said top, said folded sections being carried beneath said rear section in top collapsed position.

8. A folding top structure for a motor vehicle comprising a flexible top, a sectional side rail at each side of said top adapted to support the latter in top raised extended position, each side rail having a rear section pivotally mounted at its rear end upon said body, an intermediate section pivotally connected to the front end of said rear section, and pivotally interconnected front sections pivotally connected to said intermediate section, said rear and front sections extending in a substantially horizontal forward direction and said intermediate section being upwardly and forwardly inclined in top raised position, a laterally extending panel member secured at each of its ends to a rear section, power link means interposed between said body and each rear section, power means operatively connected to said power link means to actuate the latter to swing each rear section above and about its pivotal mounting rearwardly to a top lowered position in which it extends in a generally horizontal direction, said panel member traveling with said rear sections from a forwardly extending position to an inverted rearwardly extending position, and link means including a first and second balance arms, each first balance arm being pivotally mounted at one end upon said body and pivotally connected at its other end to an intermediate section, each second balance arm being pivotally connected at one end thereof to a rear section and at its other end to a front section, said balance arms being effective to fold said front and intermediate sections against the respective rear sections as the latter swing about their pivotal mounting to thereby collapse said top against said panel member, said folded sections being carried beneath said rear section in top collapsed position.

9. A folding top structure for a motor vehicle comprising a flexible top, a sectional side rail at each side of said top adapted to support the latter in top raised extended position, each side rail having a rear section pivotally mounted at its rear end upon said body, an intermediate section pivotally connected to the front end of said rear section, and pivotally interconnected front sections pivotally connected to said intermediate section, said rear and front sections extending in a substantially horizontal forward direction and said intermediate section being upwardly and forwardly inclined in top raised position, a laterally extending panel member secured at each of its ends to a rear section, power link means interposed between said body and each rear section, power means operatively connected to said power link means to actuate the latter to swing each rear section above and about its pivotal mounting rearwardly to a top lowered position in which it extends in a generally horizontal direction, said panel member travelling with said rear sections from a forwardly extending position to an inverted rearwardly extending position, and link means including a first and second balance arms, each first balance arm being pivotally mounted at one end upon said body and pivotally connected at its other end to an intermediate section, each second balance arm being pivotally connected at one end thereof to a rear section and at its other end to a front section, said balance arms being effective to fold said front and intermediate sections against the respective rear sections as the latter swing about their pivotal mounting to thereby collapse said top against said panel member, said top being collapsed against the side of said panel member which is the upper side in top raised position, said upper side becoming the lower side in top collapsed position and said top being stored therebeneath.

10. In a foldable top structure for a vehicle body, an articulated side rail having in top raised position substantially horizontal and forwardly extending front and rear members joined by an upwardly and forwardly inclined intermediate member, means pivotally mounting said rear member at its rear end on a support member on said vehicle body for swinging movement, said rear member being swingable above and about said pivotal mounting means to a substantially horizontal and rearwardly extending top lowered position, and link means comprising balance arm means pivotally coupled to selective ones of said members, said link means controlling the movement of the rail members relative to one another to cause said front and intermediate members to be folded against said rear member as the latter swings about its pivotal mounting to said top lowered position to thereby collapse said top, said front and intermediate members being stored beneath said rear member in top collapsed position.

11. A folding top structure for a motor vehicle comprising a flexible top, articulated side rails at each side of said top adapted to support the latter in top raised extended position, said side rails including rear members, a pair of spaced supporting brackets mounted on said vehicle body, each rear member being pivotally connected to a respective bracket, a laterally extending cross member secured at each of its ends to a rear member, said rear members and cross member in top raised position extending in a substantially horizontal and forward direction, said rear members and cross member being swingable above and about the pivotal connection to said brackets to a substantially horizontal and rearwardly extending top lowered position, and link means comprising balance arm means pivotally coupled to sections of said articulated side rails, said link means controlling the movement of said sections relative to one another to cause the latter to be folded against said rear member as the latter and said cross member is swung about said pivotal connection to said top lowered position to thereby collapse said top against said cross member, said folded sections and top being stored beneath said rear members and cross member in top collapsed position.

References Cited in the file of this patent

UNITED STATES PATENTS

| | | |
|---|---|---|
| 2,498,868 | Vigmostad | Feb. 28, 1950 |
| 2,762,649 | Doty | Sept. 11, 1956 |
| 2,833,593 | Olivier | May 6, 1958 |